US011156769B2

(12) United States Patent
Ahmad et al.

(10) Patent No.: US 11,156,769 B2
(45) Date of Patent: Oct. 26, 2021

(54) POLARIZATION-MAINTAINING FIBER DEVICE SUPPORTING PROPAGATION IN LARGE MODE FIELD DIAMETERS

(71) Applicant: OFS Fitel, LLC, Norcross, GA (US)

(72) Inventors: Raja A Ahmad, South Bound Brook, NJ (US); Man F Yan, Berkeley Heights, NJ (US); David J DiGiovanni, Mountain Lakes, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/384,791

(22) Filed: Apr. 15, 2019

(65) Prior Publication Data

US 2019/0243061 A1 Aug. 8, 2019

Related U.S. Application Data

(63) Continuation-in-part of application No. 15/474,189, filed on Mar. 30, 2017, now Pat. No. 10,261,246.

(60) Provisional application No. 62/434,180, filed on Dec. 14, 2016.

(51) Int. Cl.
  *G02B 6/02* (2006.01)
  *G02B 6/024* (2006.01)
  *G02B 21/16* (2006.01)
  *H01S 3/067* (2006.01)
  *G02B 6/14* (2006.01)

(52) U.S. Cl.
  CPC ......... *G02B 6/024* (2013.01); *G02B 6/02023* (2013.01); *G02B 6/14* (2013.01); *G02B 21/16* (2013.01); *H01S 3/06712* (2013.01)

(58) Field of Classification Search
  CPC .............. G02B 6/02042; G02B 6/0281; G02B 6/0288; G02B 6/024; G02B 6/036; G02B 6/0286; G02B 6/0285; G02B 6/255; H01S 3/094007; H01S 3/06733; H01S 3/067; H01S 3/06754; H01S 3/06712
  USPC ............................................ 385/11, 123–128
  See application file for complete search history.

(56) References Cited

U.S. PATENT DOCUMENTS

| 7,050,672 | B1 | 5/2006 | Matsumoto et al. |
| 7,110,647 | B2 | 9/2006 | Farroni et al. |
| 7,289,687 | B2 | 10/2007 | Izoe et al. |
| 7,430,353 | B2 | 9/2008 | Aikawa et al. |
| 8,139,912 | B2 | 3/2012 | Gapontsev et al. |

(Continued)

OTHER PUBLICATIONS

Larsen, S.H.M., et al., "Polarization-maintaining higher-order mode fiber module with anomalous dispersion at 1 μm", 2012 Optical Society of America, Oct. 15, 2012/vol. 37, No. 20/Optics Letters, pp. 4170-4172.

(Continued)

*Primary Examiner* — Thomas A Hollweg
*Assistant Examiner* — Hung Q Lam
(74) *Attorney, Agent, or Firm* — Wendy W. Koba, Esq.

(57) ABSTRACT

A higher-order mode (HOM) fiber is configured as a polarization-maintaining fiber by including a pair of stress rods at a location within the cladding layer that provides for a sufficient degree of birefringence without unduly comprising the spatial mode profile of the propagating higher-order modes. An optical imaging system utilizing polarization-maintaining HOM fiber allows for different wavelength probe signals to be directed into different modes, useful in applications such as STED microscopy, 2D sensing, and the like.

6 Claims, 7 Drawing Sheets

(56) References Cited

U.S. PATENT DOCUMENTS

| | | |
|---|---|---|
| 8,797,642 B2 | 8/2014 | Chen et al. |
| 9,031,099 B2 | 5/2015 | Gapontsev et al. |
| 9,306,364 B2 | 4/2016 | Gapontsev et al. |
| 9,356,418 B2 | 5/2016 | Saracco et al. |
| 9,400,352 B2 | 7/2016 | Hayashi et al. |
| 2005/0226580 A1* | 10/2005 | Samson ............... G02B 6/024 385/127 |
| 2007/0177846 A1* | 8/2007 | Chen ............... C03B 37/01217 385/125 |
| 2011/0091177 A1 | 4/2011 | Gapontsev et al. |
| 2012/0250143 A1* | 10/2012 | Dong ............... C03B 37/01217 359/341.3 |
| 2016/0245989 A1 | 8/2016 | Suzuki et al. |
| 2016/0291247 A1 | 10/2016 | Dong et al. |

OTHER PUBLICATIONS

Ramachandran, Siddharth, et al., "Generation and propagation of radically polarized beams in optical fibers", 2009 Optical Society of America, Aug. 15, 2009/vol. 34, No. 16/Optics Letters, pp. 2525-2527.

* cited by examiner

POLARIZATION-MAINTAINING FIBER DEVICE SUPPORTING PROPAGATION IN LARGE MODE FIELD DIAMETERS

CROSS-REFERENCE TO RELATED APPLICATIONS

This application is a continuation-in-part of U.S. application Ser. No. 15/474,189, filed Mar. 30, 2017, which claims the benefit of U.S. Provisional Application Ser. No. 62/434,180, filed Dec. 14, 2016, both prior applications incorporated herein by reference.

TECHNICAL FIELD

The present invention relates to polarization-maintaining optical fibers and, more particularly, to the inclusion of a polarization-maintaining structure within a large mode area fiber supporting one or more higher-order modes.

BACKGROUND OF THE INVENTION

Polarization-maintaining (PM) fibers typically utilize a pair of stress rods, disposed longitudinally along opposing sides of the core region (symmetrical configuration) to create stress-induced birefringence within an optical signal propagating along the core region of the optical fiber, splitting the signal into orthogonally polarized modes. The stress rods are formed of a material exhibiting a high thermal expansion such that during the process of drawing an optical fiber from a preform, the rods create a stress state that is "frozen" within the final form of the fiber. The diameter (D) of each stress rod, as well as its displacement from the center of the core region (R1), determine the strength of the birefringence that may be achieved. Larger diameter rods and/or closer proximity of the rods to the center of the core region are preferred designs that create a state of higher birefringence (i.e., greater splitting between the orthogonally polarized modes).

PM fibers have successfully been used for many years, primarily in situations where standard single-mode fiber is employed; that is, fibers having core regions no greater than about 10 µm, with surrounding cladding layers sufficiently large enough to allow for optimum placement of relatively large diameter stress rods.

In situations requiring high power outputs, large mode area fibers may be employed, where these fibers are known to have core region diameters in excess of 40-50 µm. Most installations utilizing these high power optical fibers still require that the fiber is able to be coiled (reducing its 'footprint' at a particular location) and, therefore, a maximum fiber outer diameter is typically no greater than about 1 mm or so. Given these constraints, the ability to configure a high power PM fiber where the stress rods are separated from the large-sized core in the same relative relationship as used for conventional fibers is not a realistic option.

Additionally, as the core size increases, more modes are allowed to propagate, giving rise to unwanted mode coupling (including mode coupling of the fundamental mode to higher-order modes, as well as coupling among various higher-order modes). Inasmuch as birefringence splits the degeneracy of these modes along the "fast" and "slow" axes, the density of modes within a polarization-maintaining arrangement is an order of two larger (i.e., higher mode density) than conventional, non-PM large mode area fibers. It has been expected by those skilled in the art that this high density of states will prohibit operation with desired levels of modal purity and polarization extinction necessary for laser or amplifier operations. Moreover, this high mode density has been expected to be exacerbated by fiber bending, as a result of introduced asymmetry into the relationship between the stress rods and the core region.

Furthermore, besides adding the desired birefringence (typically on the order of $>10^{-4}$) between the optical modes and maintaining a polarization extinction ratio (PER) that exceeds 10 dB over a typical fiber length of 1 meter, a useful PM, large-mode-area fiber is expected to maintain other characteristic properties such as a stable spatial distribution with well-separated propagating constants among the various guided modes.

These concerns, among others, would have one skilled in the art conclude that it is unlikely that a polarization-maintaining large mode area fiber useful for laser or amplifier applications can be achieved as a commercial product offering.

SUMMARY OF THE INVENTION

The various problems and concerns mentioned above are addressed by the present invention, which relates to polarization-maintaining optical fibers and, more particularly, to the inclusion of a polarization-maintaining structure within a large mode area fiber supporting one or more higher-order modes.

In accordance with an exemplary embodiment of the present invention, a higher-order mode (HOM) fiber is configured as a polarization-maintaining fiber by including a pair of stress rods at a location substantially within the cladding that provides for a sufficient degree of birefringence without unduly compromising the spatial mode profile of the specific higher-order modes propagating along the polarization-maintaining optical fiber.

As will be discussed in detail below, a set of parameters has been developed associated with the diameter (D) of the stress rods and displacement (R1) of the rods from the center of the core region that yield a configuration with an acceptable birefringence and polarization extinction ratio (PER) within the HOM fiber for specific higher-order modes, even in situations where the fiber is bent. The configurations of various embodiments of the present invention have been found to maintain the desired value of birefringence (with minimal changes in spatial mode profile) for a fiber bend radius down to less than 50 cm.

Exemplary embodiments of the present invention take the form of an optical fiber having an inner, central core for supporting the propagation of a lower-order mode (such as the fundamental mode $LP_{01}$) of an optical signal, surrounded by an outer core for supporting the propagation of one or more selected higher-order modes. The relative refractive index difference between the inner and outer cores is designed to support both the fundamental mode and the higher-order modes. The outer core is surrounded by a cladding region. The propagation of one or more selected higher-order modes is supported by the cladding region, which exhibits a refractive index value that is lower than the refractive index value of the outer core. Various configurations of these exemplary embodiments may comprise one or more separate cladding layers. An inner cladding layer (adjacent to the outer core) may be formed to have a lower refractive index value than an outer cladding layer, where the inner cladding layer may be configured to confine one or more selected higher-order modes to the core. A pair of stress rods is included within the optical fiber and is disposed substantially within the cladding region and positioned symmetrically with respect to the inner core region. Values of D within the range of 50-150 μm and R1 of 40-200 μm have been found to provide acceptable levels of birefringence for the desired large mode field diameters in accordance with one or more embodiments of the present invention. In various embodiments, long-period gratings may be used as mode couplers at the input and output of the PM-HOM fiber.

One property used to evaluate the suitability of a PM-HOM fiber is a normalized effective area, defined as the effective area $A_{eff}$ divided by the square of the propagating wavelength. For the purposes of the present invention, various exemplary fiber design s are able to maintain the desired polarization state (i.e., maintain a defined polarization extinction ratio (PER)) for high power applications at a normalized fiber effective area $A_{eff}/\lambda_2 > 1000$.

One exemplary embodiment of the present invention takes the form of a polarization-maintaining optical fiber comprising an inner core of a predetermined size and having a first refractive index value, with an outer core (exhibiting a second refractive index value) disposed to surround the inner core. A cladding layer (or layers) is disposed to surround the outer core, where the combination of the inner core, outer core and cladding (as well as their relative refractive index values) is configured to support the propagation of lower-order modes (LOMs), including the fundamental LP01 mode, in the inner core and the propagation one or more defined higher-order $LP_{nm}$ modes within the outer core. The PM fiber further includes a pair of stress rods disposed substantially within the cladding layer on either side of the outer core and arranged along a common axis, defining a slow polarization axis, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

Another exemplary embodiment of the present invention may be presented as a polarization-maintaining optical system including the following: an optical signal input configuration for supporting the propagation of an incoming lower-order mode (LOM) multi-wavelength polarization-controlled optical signal, an input mode converter disposed at an output termination of the optical signal input configuration for converting at least a first wavelength portion of the LOM multi-wavelength optical signal into a selected, higher-order $LP_{nm}$ mode signal, and a polarization-maintaining higher-order mode (PM-HOM) optical fiber coupled to the input mode converter. In this embodiment, the PM-HOM optical fiber supports the propagation of both the mode-converted first wavelength signal portion propagating at the selected higher-order $LP_{nm}$ mode and a second wavelength portion propagating at a different mode. The PM-HOM optical fiber itself includes the various element described above.

One particular configuration of the above-described system embodiment is particularly well-suited for Stimulated Emission Depletion (STED) microscopy, where the input optical signal at least a first wavelength $\lambda_1$ associated with an emission band of a material under study and a second wavelength $\lambda_2$ associated with an absorption band of the material under study. In this configuration, the selected HOM provides for contrasts of illumination/darkness of the material as a function of wavelength.

Various exemplary embodiments of the present invention may be formed as PM-HOM gain fiber for optical amplifiers. In these cases, the light propagating regions are formed to include one or more specific dopants, such as Tm, Er, Yb, Nd, Ho or other rare-earths, that can provide optical gain.

Other exemplary embodiments of the present invention may be formed as single-polarization HOM devices with a tunable frequency bandwidth of operation. For these single-polarization embodiments, a long period grating serves as a source of HOM generation, while also providing mode conversion over a distinct frequency range for different orthogonal polarization states.

Other and further aspects and embodiments of the present invention will become apparent during the following discussion and by reference to the accompanying drawings.

BRIEF DESCRIPTION OF THE DRAWINGS

Referring now to the drawings.

DETAILED DESCRIPTION

We have discovered that for certain ranges of stress rod diameter D and stress rod displacement R1 ("displacement" defined as the separation between a center of the optical fiber and an interior edge of stress rod), it is possible to configure a PM-HOM optical fiber that satisfactorily performs in various high power applications (e.g., lasers, amplifiers, or the like). A birefringence of at least $10^{-4}$ has been obtained for an optical fiber having a normalized effective area ($A_{eff}/\lambda^2$) greater than 1000. By understanding the trade-offs between the diameter of the stress rods and the displacement between the stress rods and the center of the core, it is been found possible to position the stress rods at a specific location where sufficient birefringence is achieved without unduly distorting the spatial electric field distribution of the various propagating optical modes, even when subjected to bending (maintaining a bend radius less than 50 cm).

Figure 1:
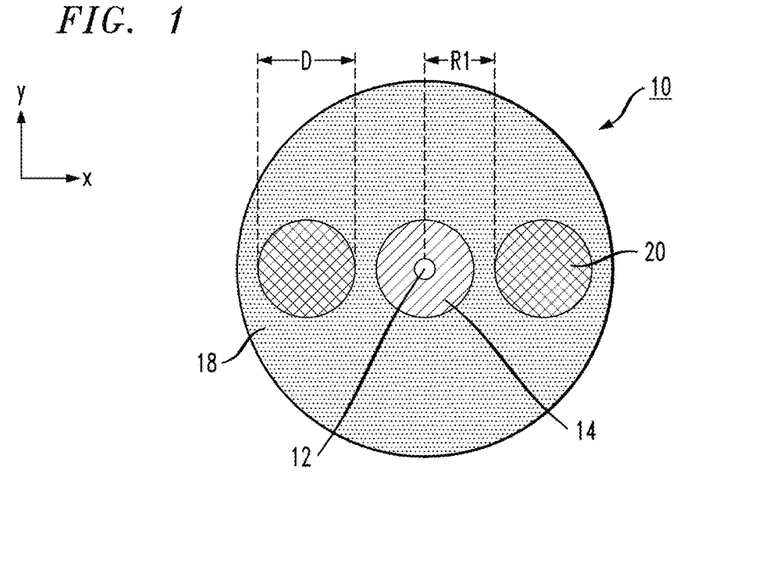
FIG. 1 is a cross-sectional fiber of an exemplary PM-HOM optical fiber formed in accordance with an exemplary embodiment of the present invention.

FIG. 1 is a cut-away view of a PM-HOM optical fiber 10 formed in accordance with an exemplary embodiment of the present invention. In this case, PM-HOM optical fiber 10 includes an inner core 12, surrounded by an outer core 14. In order to support the propagation of higher-order modes, the combination of inner core 12 and outer core 14 comprises a "pedestal" configuration, with a relatively large core diameter (in comparison to conventional single mode or multimode optical fibers). For example, a diameter across outer core 14 in the range of 40-50 µm is typical for a large core diameter application.

A cladding layer 18 is disposed to surround outer core 14. A pair of stress rods 20 formed of a material having a coefficient of thermal expansion (CTE) that is significantly different from the CTE of cladding layer 18. As shown in FIG. 1, the pair of stress rods 20 is disposed substantially within cladding layer 18 and positioned symmetrically with respect to the center of inner core 12. In an exemplary embodiment of the present invention, stress rods 20 comprise boron-doped silica (preferably with a boron concentration in the range of 10 mole % to 30 mole %). In general, stress rods 20 may be formed of any material that exhibits the requisite difference in CTE (with respect to the CTE of the material forming cladding layer 18) required to create stress-induced birefringence within the drawn optical fiber. In one exemplary embodiment, stress rods 20 were formed to exhibit a CTE of $2.37 \times 10^{-6}$/K (as compared to the surrounding silica cladding layer 18, which has a CTE of $0.5 \times 10^{-6}$, yielding a difference in CTE (also referred to variously herein as $\Delta$CTE) of about $1.87 \times 10^{-6}$/K, providing the desired birefringence. In general a $\Delta$CTE in the range of about $0.5 \times 10^{-6}$/K to $7.5 \times 10^{-6}$/K is considered to be useful for the purposes of the present invention. Materials such as, but not limited to, $B_2O_3+SiO_2$ and $B_2O_3+P_2O_5+SiO_2$ have been used (with B-dopant having a concentration of 10-30 mole % and the P-dopant concentration being between 0-20 mole %). Other dopants, such as Ge and F, may also be used. Additionally, as discussed below, stress rods are not limited to having a circular geometry.

The core structure as shown in FIG. 1 is designed to guide the fundamental mode $LP_{01}$ of a propagating optical signal within inner core 12, and to propagate higher-order modes (HOMs), for example $LP_{03}$ and/or $LP_{08}$ within both inner core 12 and outer core 14. In general, inner core 12 may be configured to propagate various other non-fundamental, lower-order modes including, but not limited to, $LP_{11}$, $LP_{12}$, and $LP_{21}$ modes. The relative refractive index difference between inner core 12 and outer core 14 is designed to support both the fundamental $LP_{01}$ mode and the higher-order modes (HOMs). In general, inner core 12 has a higher refractive index than outer core 14 (see, for example, the refractive index profile of FIG. 2). However, other embodiments are contemplated for consideration in creating a PM-HOM fiber in accordance with the inventive teachings where, for example, a depressed-index trench may be included between inner core 12 and outer core 14, with the trench having a refractive index that is less than either of the core regions. In this case, the width of the trench is selected to guide the HOMs substantially within outer core 14.

During the fabrication process as the fiber is drawn down from an optical preform, the presence of large $\Delta$CTE stress rods 20 creates a non-uniform radial stress distribution across the fiber cross section, where this non-uniform stress remains "frozen" in the final form of the fiber. As a result, optical signals thereafter propagating within the fiber experience stress-induced birefringence that splits the signal into orthogonally polarized modes, denoted as the orthogonal "fast" and "slow" axes of the fiber.

As mentioned above and discussed in detail below, the diameter D of the stress rods, as well as their displacement R1 from the center of inner core 12 (as shown in FIG. 1) are chosen in accordance with one or more embodiments of the present invention to realize as high a stress-induced birefringence as possible for the selected HOMs propagating within inner core 12 and outer core 14, while minimizing the potential for introducing asymmetries in the spatial mode profile of the guided higher-order modes. Again, it is to be understood that various embodiments may include a depressed-index trench between inner core 12 and outer core 14 in assist in confining HOMs to outer core 14.

Figure 2:
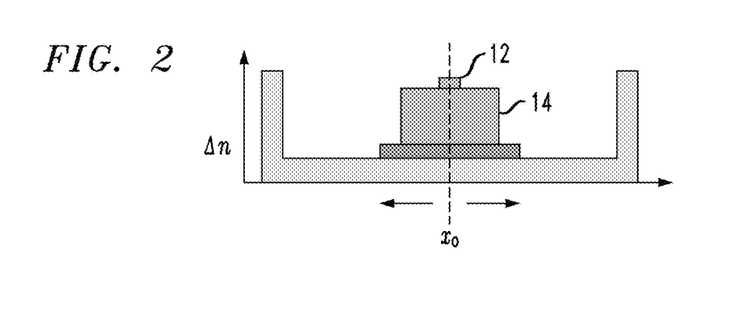
FIG. 2 is a refractive index profile for the exemplary fiber shown in FIG. 1.

FIG. 2 is a refractive index profile for PM-HOM optical fiber 10, in this illustrating case the profile associated with the "slow", horizontal polarization axis, where the propagating optical signal is affected by the presence of the stress rods. As mentioned above, stress rods 20 are formed of a material (for example, borosilicate glass), that will create a large $\Delta$CTE with respect to cladding layer 18. When using borosilicate glass, it is the case that this material exhibits a low refractive index value (indeed, the refractive index value may be similar to the refractive index of cladding layer 18) as shown in FIG. 2. While necessary for providing the difference in thermal expansion property required to create stress-induced birefringence, this low refractive index value may alter the fiber's waveguiding properties in a manner that distorts the propagating beams. In other exemplary embodiments, the composition of stress rods 20 may be configured to exhibit a refractive index value substantially the same as silica glass, thus minimizing the distortion problem. As mentioned elsewhere, dopants such as P, and Ge may be used in combination with, or instead of boron, to form stress rods 20, where various ones of these alternatives may exhibit a refractive index value close to that of silica glass.

Figure 3:
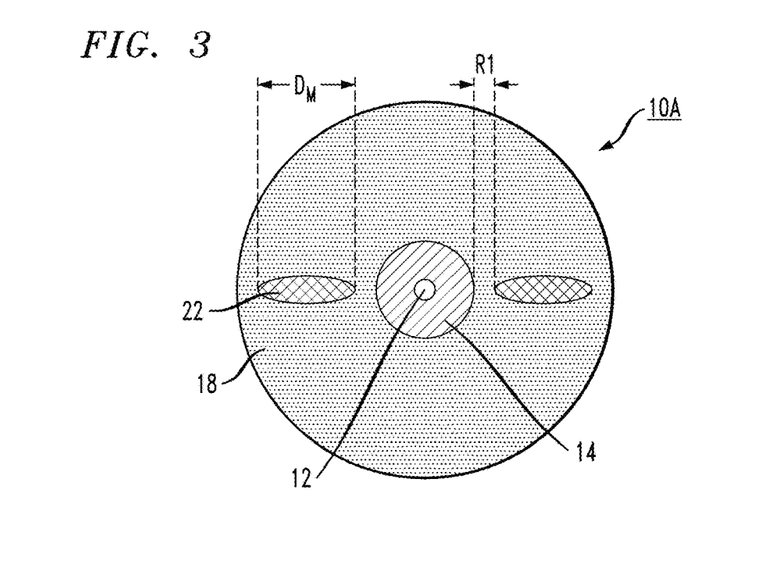
FIG. 3 is a cross-sectional view of an alternative exemplary embodiment of a PM-HOM optical fiber, including non-circular (here, elliptical) stress rods disposed within the cladding.

FIG. 3 is a cross-sectional view of an alternative exemplary embodiment of the present invention. Here, a pair of non-circular stress rods 22 is disposed substantially within cladding region 18 and positioned symmetrically with respect to inner core 12. As shown, stress rods 22 are elliptical in form, in this particular configuration with the major axis of each rod aligned with the "slow axis" of the polarization state induced within the optical fiber (generally, any orientation of the stress rods with respect to the core is contemplated). Similar to the exemplary embodiment discussed above in association with FIG. 1, both the displacement R1 between the center of inner core 12 and an inner edge of each non-circular stress rod 22 and the equivalent diameter DM (defined below) of stress rods 22 are parameters that are configured in accordance with one or more exemplary embodiments of the present invention to provide polarization-maintaining propagation of a selected higher-order mode optical signal. For non-circular stress rod 22, the equivalent rod diameter DM is given as $(4A_{cs}/\pi)^{1/2}$, where $A_{cs}$ is the cross-section area of the stress rod. For birefringence analysis of PM-HOM in deploying non-circular stress rods, the equivalent diameter "DM" is used in the same context as "D" in the case of circular stress rods.

Figure 4:
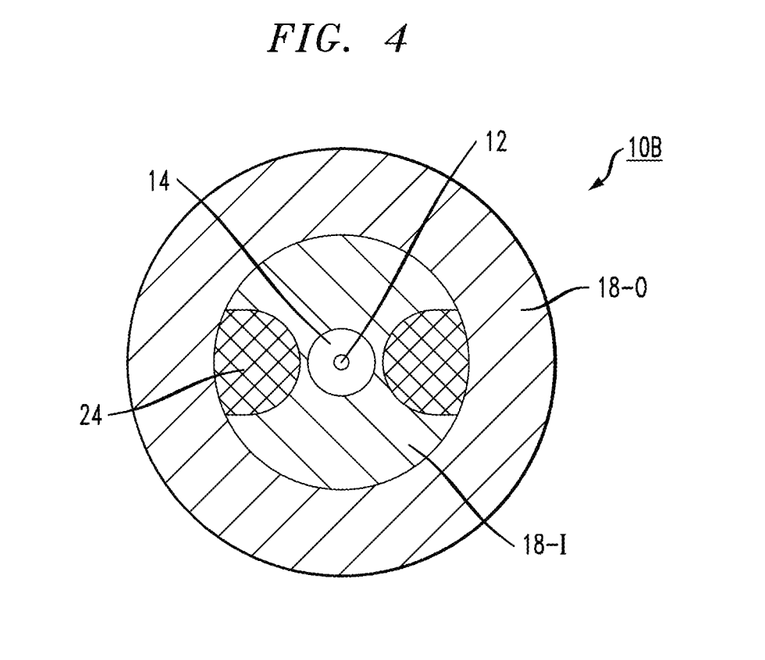
FIG. 4 is a cross-section view of yet another exemplary embodiment of a PM-HOM optical fiber, in this case including a pair of non-circular ("D"-shaped") stress rods.

Yet another exemplary embodiment of the present invention, also using non-circular stress rods, is shown in FIG. 4. In this particular exemplary embodiment, cladding layer 18 is formed as two separate layers: an inner cladding layer 18-I having a first refractive index value, and an outer cladding layer 18-O having a second, higher refractive index value (relative to inner layer 18-I). In this particular embodiment, a pair of "D"-shaped, non-circular stress rods 24 is disposed within inner cladding layer 18-I, disposed at the boundary with outer cladding layer 18-O. Again the diameter D of stress rods 24 and their displacement R1 from the center of inner core 12 are factors useful in providing the desired amount of birefringence within the HOM fiber. It is to be understood that the exemplary "non-circular" geometries shown in FIGS. 3 and 4 are exemplary only, and there exist many other geometries (such as, for example, the known 'bow-tie' stress rod geometry) that may be used in exemplary embodiments of the present invention.

Figure 5:
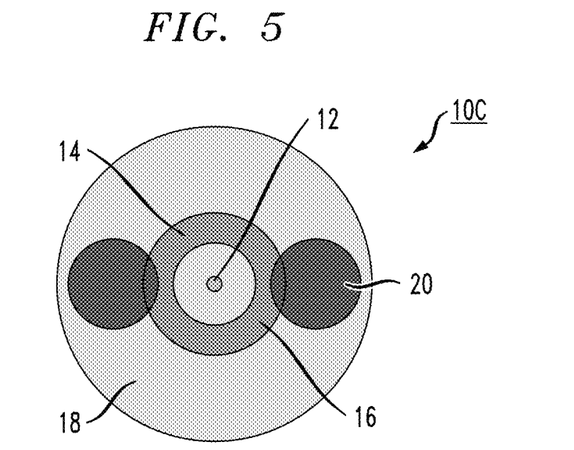
FIG. 5 illustrates yet another exemplary embodiment of a PM-HOM optical fiber formed in accordance with one or more embodiments of the present invention, in this case including a trench region disposed between the outer core region and the cladding layer.

FIG. 5 is a cross-sectional view of yet another polarization-maintaining optical fiber formed in accordance with the present invention. In this particular configuration, a trench layer 16 is disposed between outer core 14 and cladding layer 18. As is well-known in the art, a trench layer having a reduced refractive index value (relative to the core) may be useful in maintaining confinement of the propagating signals to the core region. When used in a polarization-maintaining structure formed in accordance with an exemplary embodiment of the present invention, stress rods 20 may overlap a portion of trench layer 16. The presence of trench layer 16 is not considered to impact the stress-induced birefringence created by the presence of stress rods 20.

Figure 6:
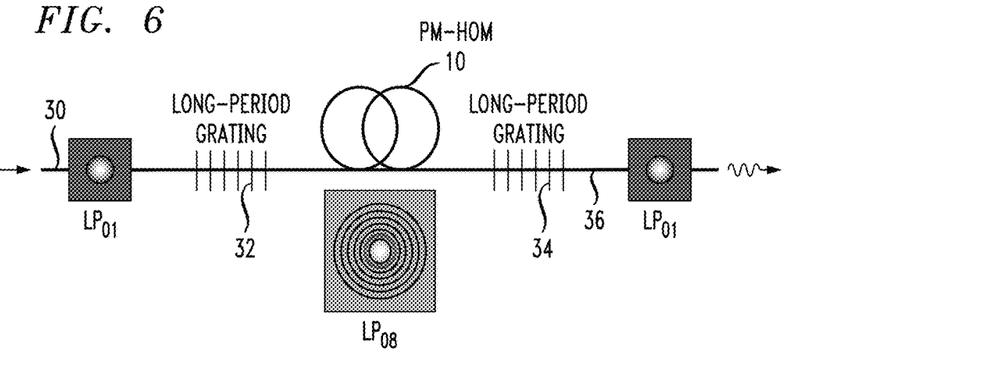
FIG. 6 illustrates an exemplary high power polarization-maintaining optical communication system utilizing a section of PM-HOM fiber in accordance with exemplary embodiments of the present invention.

An exemplary polarization-maintaining, high-power optical system utilizing a section of PM-HOM optical fiber 10 is shown in FIG. 6. In this case, an optical signal input configuration is shown as utilizing an incoming (polarized) optical signal which propagates along a section of conventional PM fiber 30. In this exemplary embodiment, PM fiber 30 provides polarization-maintained propagation of the fundamental $LP_{01}$ mode (or other non-fundamental, lower-order modes, e.g., $LP_{11}$, $LP_{12}$, $LP_{21}$). In order to provide a high power arrangement as necessary for various applications (lasers, amplifiers, etc.), it is desirable to provide a large mode field area. Thus, in accordance with an exemplary embodiment of the present invention, a section of PM-HOM optical fiber 10 is used to achieve the high power results while maintaining the polarization properties of the propagating signal.

Figure 7:
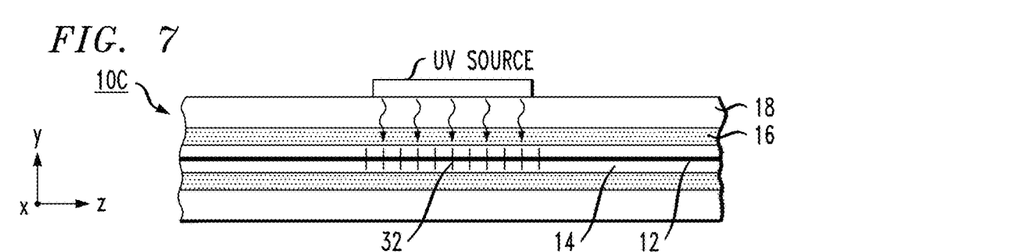
FIG. 7 is a side view of a section of PM-HOM fiber, showing a preferred orientation of the fiber during the process of creating a long-period grating (LPG) used for mode conversion (at the input, and possibly output, of the section of PM-HOM fiber)
Figure 8:
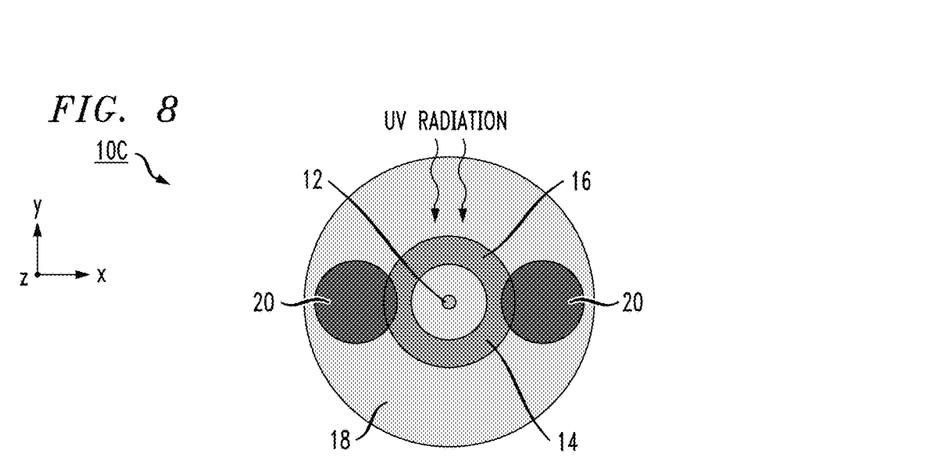
FIG. 8 is a side view of the illustration of FIG. 7, particularly showing the orientation of the UV writing beam (for creating the LPGs) with respect to the stress rods within the PM-HOM fiber.

As shown in FIG. 6, an input mode converter 32 (here, a long-period grating) is disposed at an input end of PM-HOM optical fiber 10 and used to convert the incoming fundamental $LP_{01}$ mode (or other non-fundamental lower order modes, etc, $LP_{11}$, $LP_{12}$, or $LP_{21}$) of the propagating signal to a selected higher-order mode (for example, $LP_{08}$) useful for a specific high power application. As mentioned above, LPGs are typically formed by "writing" a grating structure into a section of the fiber core region, modifying the refractive index along a predetermined length of the core region in manner that causes modal conversion to take place. In accordance with various exemplary embodiments of the present invention, it is preferred that the optical fiber is oriented during LPG fabrication to ensure that the UV-beam is applied along the fast axis of inner core 12 of PM-HOM optical fiber 10. FIG. 7 is a side view showing the application of UV radiation to inner core 12 of PM-HOM optical fiber 10C (as shown in FIG. 5), the UV radiation utilized to create LPG 32, FIG. 8 is an end view of PM-HOM fiber 10C, showing the application of the UV radiation along the fast axis (i.e., orthogonal to the position of stress rods 20).

In various embodiments, LPG 32 may be are formed within only inner core 12 of fiber 10. In other embodiments, outer core 14 may also be photosensitized and, therefore, LPG 32 can be inscribed within only outer core 14. In other words, the gratings are preferably formed within the inner/outer core regions (in accordance with one or more embodiments of the present invention) such that the overlap factor of electric field distribution for the interacting lower-order and higher-order modes is 'non-zero' across the fiber cross-section, which allows energy exchange (conversion) among the interacting modes.

Referring back to FIG. 6, the polarization-maintaining, higher-mode optical output signal from PM-HOM optical fiber 10 is shown as coupled to an exemplary output configuration, in this example comprising a second mode converter 34 which is used to re-convert the processed signal back into a desired, lower-order mode (e.g., fundamental mode $LP_{01}$) signal that will propagate along an output signal path. In one exemplary embodiment, the output from PM-HOM optical fiber 10 is coupled into a section of conventional PM fiber 36.

It is to be understood that the configuration as shown in FIG. 6 is exemplary only and many other configurations for both optical signal input and output configurations are possible. Indeed, certain applications may not require the use of polarization-maintaining mode converters, or may utilize structures other than LPGs to perform mode conversion. As will be discussed below, the creation of LPGs in large mode area, polarization-maintaining optical fiber results in generating certain higher-order modes, which may be used for certain applications (such as, but not limited to, single polarization applications).

Figure 9:
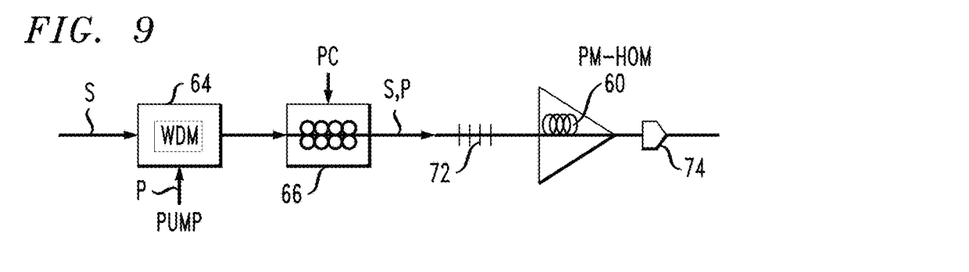
FIG. 9 is a diagram of a fiber-based amplifier arrangement utilizing PM-HOM optical gain fiber formed in accordance with one or more embodiments of the present invention.

As mentioned above, one exemplary embodiment of the present invention is associated with the formation of polarization maintaining fiber-based amplifier arrangements. FIG. 9 illustrates an exemplary optical amplifier utilizing PM-HOM fiber 60 that is formed to include one or more dopants (i.e., Tm, Er, Yb, Nd, Ho or other rare earth dopant) known to provide signal amplification in the presence of a pump signal.

In the exemplary embodiment shown in FIG. 9, the optical signal input configuration is shown as comprising a conventional optical fiber 62 supporting the propagation of an incoming optical signal S. A separate pump wave input P is combined with the incoming signal within a wavelength division multiplexer 64 (or other suitable type of optical combiner), where the combination of signal S and pump P are shown in this exemplary embodiment as passing through a discrete polarization controller 66, used to align both the signal S and pump P along a desired state of polarization (SOP).

The polarized version of the signal and the pump are thereafter passed through an input mode converter 72 (for example, an LPG), which transfers the energy propagating in a lower-order mode into the higher-order mode supported by PM-HOM 60. The presence of the pump wave within the doped fiber of PM-HOM 60 results in generating optical amplification within the polarized optical signal S.

The amplified, polarized output signal form PM-HOM 60 is shown in FIG. 9 as coupled into an output signal configuration, which in this particular exemplary embodiment utilizes an optical lens 74, such as an axicon lens, to perform the mode conversion operation. In accordance with the various embodiments of the present invention, any arrangement that does utilize mode converters should also be properly configured as polarization maintaining devices. In yet another embodiment, a free-space propagating polarized beam may be used as the input to PM-HOM fiber 10, 60, with a suitable lens (such as an axicon lens) used to couple the incoming free-space beam into the PM-HOM fiber.

There are various imaging and sensing applications that may also utilize PM-HOM optical fiber in accordance with the teachings of the present invention. As explained below, Stimulated Emission Depletion (STED) microscopy, two-dimensional imaging, and the like may utilize various combinations of lower-order mode (LOM) polarized beams and HOM co-polarized beams (perhaps operating at different wavelengths) to create arrays of imaging data.

Figure 10:
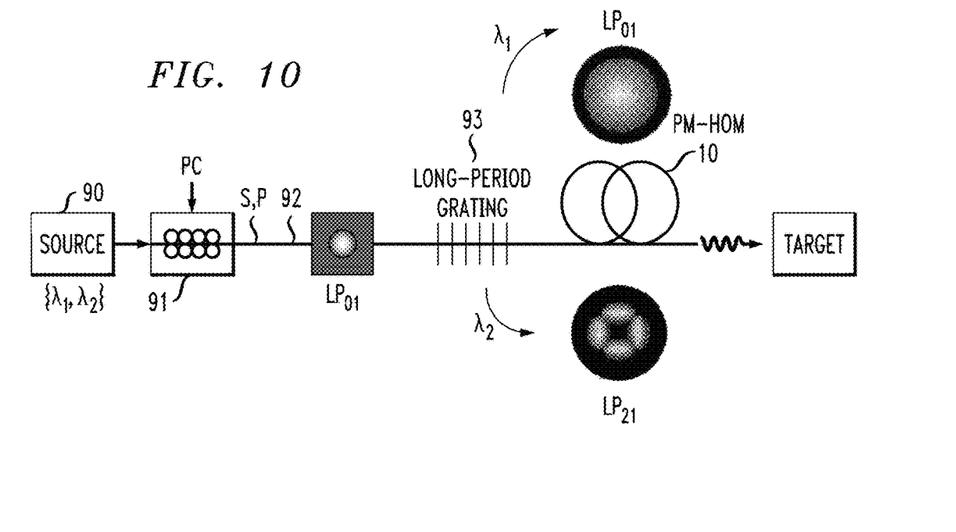
FIG. 10 is a diagram of a multi-wavelength optical imaging system utilizing PM-HOM optical fiber formed in accordance with one or more embodiments of the present invention.

FIG. 10 illustrates an exemplary multi-dimensional analysis arrangement using PM-HOM fiber 10. In this case, an input light source 90 generates a multi-wavelength output that consists of at least two different wavelengths (shown here as $\lambda_1$ and $\lambda_2$, where $\lambda_1 < \lambda_2$). The multi-wavelength output from source 90 is passed through a polarizer 91 and thereafter coupled into a section of polarization-maintaining single mode fiber 92. At this point, the multi-wavelength, polarized beam is propagating only in the fundamental $LP_{01}$ mode.

The multi-wavelength, polarized beam then passes through an LPG 93 that is specifically configured to convert a selected wavelength range (for example, a bandwidth encompasses $\lambda_2$, but not $\lambda_1$). While the beam at both wavelengths remains polarized, only the portion operating at (or near) $\lambda_2$ will be converted to the selected HOM, and continue to propagate as a polarized HOM beam. In this particular example, LPG 93 is configured to convert the signal at $\lambda_2$ to the $LP_{21}$ mode. The remaining portion of the input (including that operating at/near $\lambda_1$) continues to propagate (as a polarized beam) in the fundamental mode through PM-HOM fiber 10. Thus, when both of these signals are coupled into PM HOM 10, their different modes illuminate different regions within PM-HOM fiber 10.

In this manner, the configuration as shown as FIG. 10 is useful for STED microscopy. The beams at the two different wavelengths maintain the same polarization state, with their modes shaped such that the portion of the beam at $\lambda_1$ is used for illumination and/or stimulation of a specific spatial region of a target of interest, and the portion of the beam at $\lambda_2$ exhibits a "dark" central spot for depletion of any fluorescence or light emission in the regions surrounding the region of interest.

In STED microscopy, the two wavelengths are usually defined by the emission and absorption bands of the material under study. However, in other imaging applications, the two wavelengths may be selected based on different criteria. For example, when using the arrangement of FIG. 10 as a high power laser welder, the wavelengths and mode patterns are particularly selected such that the bright spot in the center of the combined spatial patterns (associated with the mode pattern of the first wavelength) induces a temperature rise, while the HOM light in the outer rings (attributed to the mode pattern of the second wavelength) facilitates in annealing for an improved weld quality, as well as an improved strength of the drilled material by preventing breakage or cleaving during post-processing.

Figure 11:
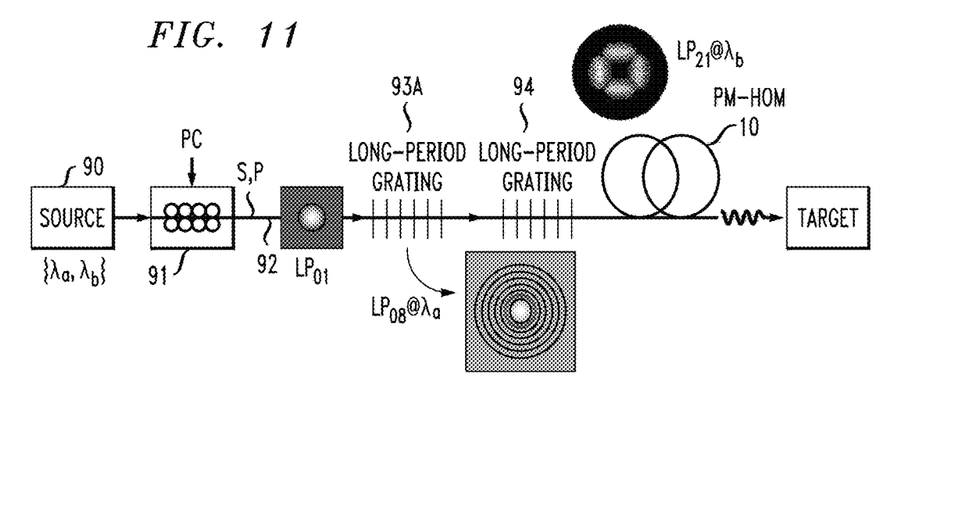
FIG. 11 is a diagram of an alternative embodiment of the multi-wavelength optical imaging system of FIG. 10, in this case utilizing a pair of mode converters, each mode converter configured to operate over a different wavelength range.

FIG. 11 illustrates another embodiment of an imaging application for PM-HOM fiber of the present invention. In this case, the imaging system as shown in FIG. 10 is modified to include a second LPG 94, concatenated to the output of first LPG 93A. Here, instead of just passing the beam at one wavelength through in its fundamental mode, a second LPG configured to provide mode conversion of at least this other wavelength. In this example, first LPG 93A is shown as performing mode conversion (into the $LP_{08}$ mode) on the portion of the multi-wavelength signal at/near $\lambda_a$, and second LPG 94 is shown as performing mode conversion of the portion of the multi-wavelength signal at/near $\lambda_b$ into the $LP_{21}$ mode. The addition of the second LPG allows for further tailoring and adjustments in the areas of the spatial pattern that are illuminated by the different wavelengths.

Figure 12:
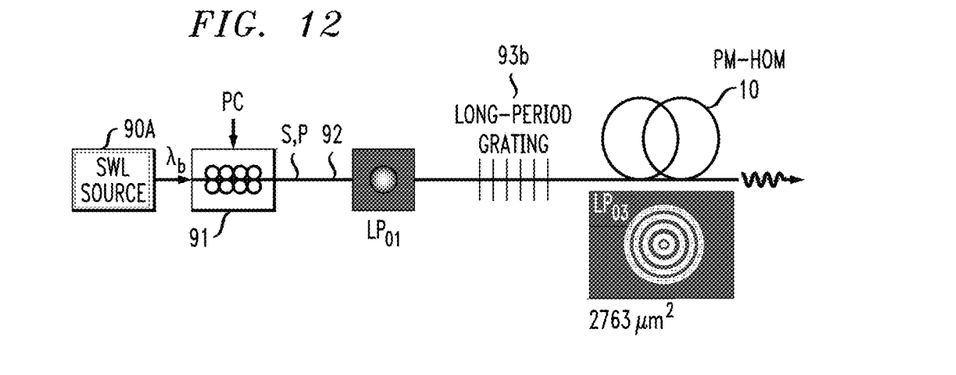
FIG. 12 is a diagram of an optical imaging system based on a single wavelength input signal, utilizing partial mode conversion and PM-HOM fiber to create a set of imaging output signals.

FIG. 12 illustrates yet another embodiment of an imaging application, where in this example, a light source 90A emits at only a single wavelength. In this case, LPG 93B is configured to only partially convert the propagating beam into a selected HOM (say, $LP_{03}$), with the remainder of the light then distributed among different modes. The differences in power may then be analyzed to perform imaging measurements.

Figure 13:
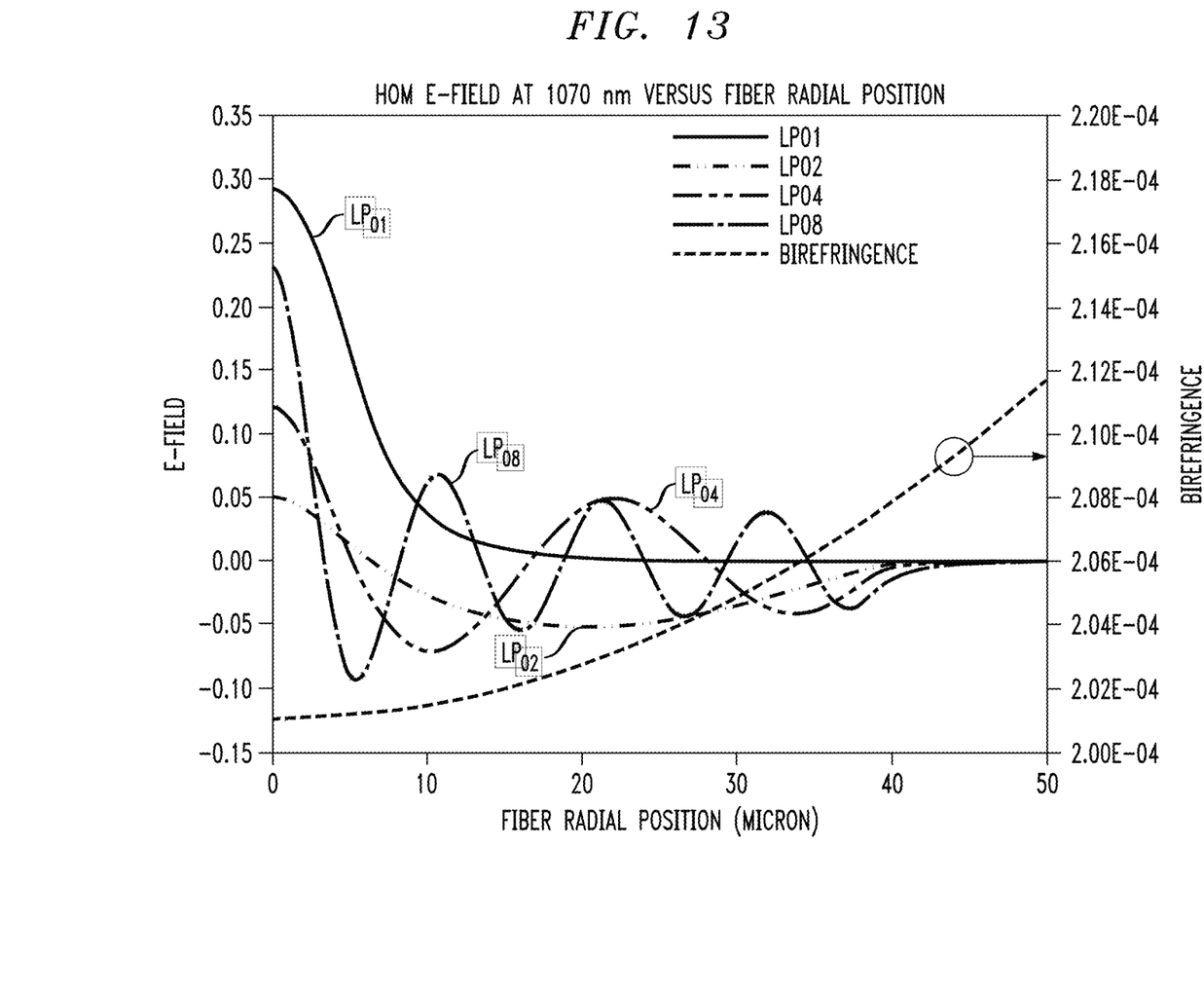
FIG. 13 contains plots of both the electric field and birefringence of an exemplary PM-HOM optical fiber (as measured axially across the core of the fiber) formed in accordance with an exemplary embodiment of the present invention.

Based on waveguide analyses performed on an exemplary configuration of PM-HOM optical fiber 10, the electric fields $E(\theta,r)$ of different $LP_{0m}$ modes has been determined, as a function of the fiber radial position (as measured outward from the center of inner core 12). The results of this analysis are shown in FIG. 13, with reference to the left-hand vertical axis. Also plotted in FIG. 10 is the birefringence $B(r, \theta)$ calculated across this same radial span (and associated with the right-hand vertical axis). The integrated birefringence for PM-HOM optical fiber 10 can then be defined as follows:

$$B_{integrated} = \frac{\int_0^{2\pi} \int_0^R E(\theta, r) * E(\theta, r) * B(\theta, r) * r \, d\theta dr}{\int_0^{2\pi} \int_0^R E(\theta, r) * E(\theta, r) r * d\theta dr}$$

The integrating birefringence of the various higher order modes $LP_{0m}$ does not change significantly from that of the fundamental ($LP_{01}$) mode, as shown in Table I, below.

TABLE I

| Mode | Integrated Birefringence (values in $10^{-4}$) |
|---|---|
| $LP_{01}$ | 2.011 |
| $LP_{02}$ | 2.034 |
| $LP_{03}$ | 2.035 |
| $LP_{04}$ | 2.034 |
| $LP_{05}$ | 2.034 |
| $LP_{06}$ | 2.033 |
| $LP_{07}$ | 2.033 |
| $LP_{08}$ | 2.033 |
| $LP_{09}$ | 2.035 |
| $LP_{0\,10}$ | 2.047 |

It is useful to note that while the stress-induced birefringence $B(r,\theta)$ has an azimuthal ($\theta$), angular dependence, the electrical fields of the radially symmetric $LP_{0m}$ modes do not. Therefore, the stress birefringence term that contains the "$\cos(2\theta)$" dependence can be ignored since an integration over $\cos(2\theta)$ from 0 to 360 degrees will be zero. While other HOMs (e.g., $LP_{nm}$) do exhibit a stress birefringence having a $\cos(2\theta)$ dependence, its effects are minimal when the mode electrical field extends substantially less than the stress rod center (e.g., about 112.5 µm in one example). Thus, it has been found that birefringence can be introduced into other radially non-symmetric HOMs, $LP_{nm}$, where n<3 and m>1.

Figure 14:
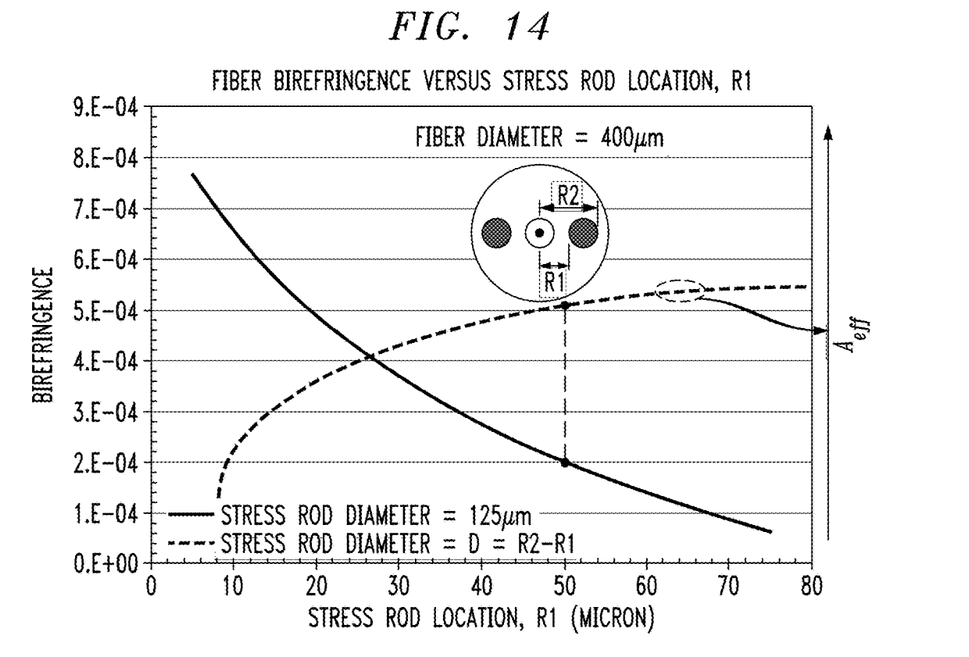
FIG. 14 is a plot of birefringence as a function stress rod location with respect to the PM-HOM fiber core region (R1)

The effects of different stress rod locations R1 on birefringence are shown in the plot of FIG. 14. The values determined here are based on the use of circular stress rods 20 with a diameter D of 125 µm, disposed symmetrically about inner core 12 (shown in the inset of FIG. 14). It is clear from this plot that as the stress rods are positioned farther away from inner core 12, the birefringence effect becomes weaker, resulting in less polarization splitting between the two axes. On the other hand, there is also a limit on how close the stress rods can be placed with respect to inner core 12 (i.e., a minimum value of R1) while still providing the desired large mode area for the high power requirements of the fiber. The effective area $A_{eff}$ measured as a function of stress rod location, is also plotted in FIG. 14.

In reviewing the information presented in the plots of FIG. 14, an exemplary embodiment of the inventive PM-HOM optical fiber may be designed to utilize a stress rod location R1 of about 50 µm, corresponding to an optimal value for $A_{eff}$, while also providing an acceptable birefringence of about $2\times10^{-4}$. When the stress rod diameter is chosen to that yielding the maximum birefringence value, small variations in stress diameter have little effects on the actual birefringence as described below.

Figure 15:
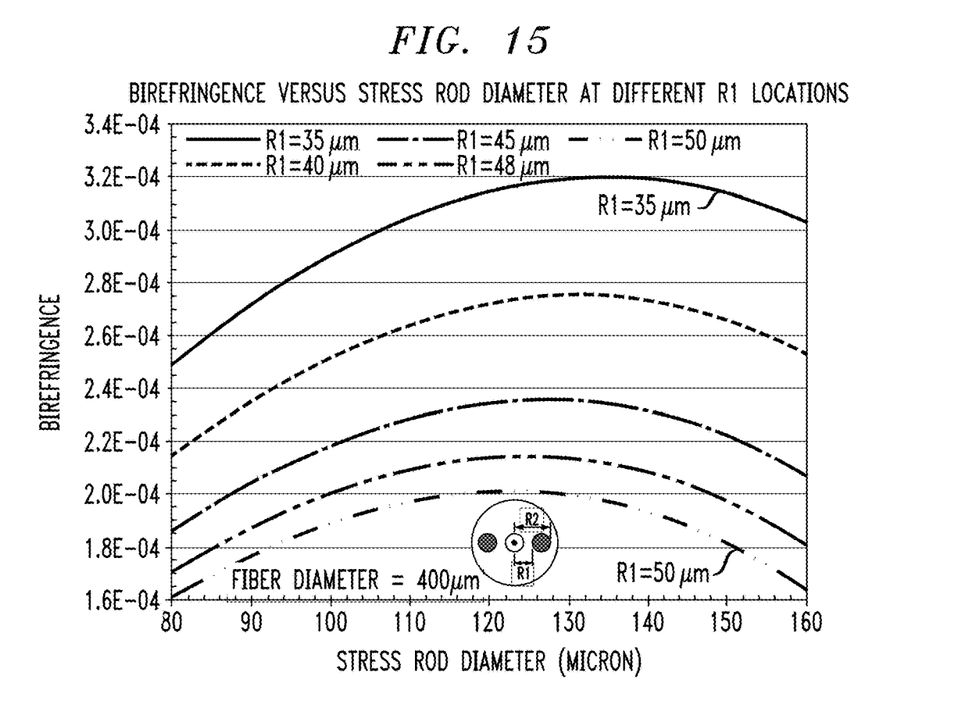
FIG. 15 contains a set of plots of birefringence as a function of stress rod diameter (D) for a set of different R1 values.

FIG. 15 contains a set of plots of birefringence as a function of stress rod diameter for a set of PM-HOM optical fibers formed in accordance with exemplary embodiments of the present invention, each embodiment based upon a different (fixed) R1 separation between the inner core and the stress rods. A fiber outer diameter of 400 µm was maintained for each embodiment, and the birefringence values associated with different stress rod diameters D (ranging from a minimum value of 80 µm to a maximum value of 160 µm) for a given rod location R1 was plotted.

It is interesting to observe from the results shown in FIG. 15 that for a given R1 value, there exists an optimal stress rod diameter D that maximizes the fiber birefringence for that R1 value. For example, in looking at the curve for R1=50 µm, a maximum birefringence is associated with stress rod diameters in the range of about 117 µm to 128 µm. More importantly, since the resultant birefringence does not significantly change with the stress diameter along this region, the optimal diameter also gives a "sweet spot" for more robust processing.

Figure 16:
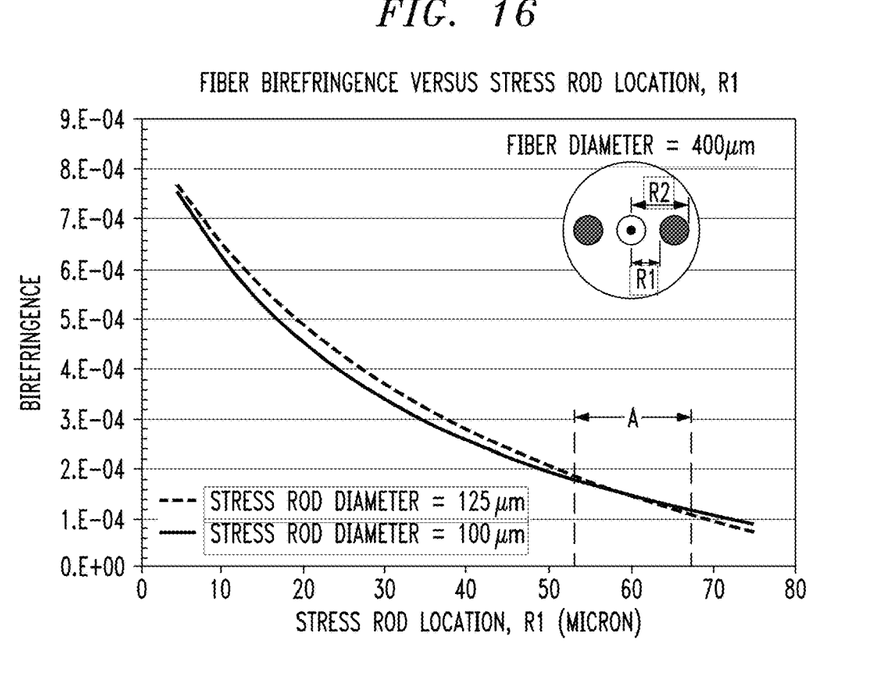
FIG. 16 contains two plots of birefringence values as a function of R1, one plot for a stress rod diameter of 100 µm, and the other associated with a stress rod diameter of 125 µm.

FIG. 16 illustrates particular plots of birefringence as a function of R1 for two different embodiments: one where the stress rod diameter has a value D=125 µm, and the other for stress rods having D=120 µm. It is clear that the difference in birefringence between these two diameter values is slight, and over a certain range of R1 (from about 50-70 µm), shown as region A in FIG. 13, the differences are minimal.

It is useful to note that the mode conversion resonance wavelength associated with an LPG of a specific period is distinct for the two orthogonal polarization states. In the example of mode conversion between the $LP_{01}$ and $LP_{08}$ modes by an LPG of period $\Lambda_{LPG}$, the resonance wavelengths for the fast and slow polarization states are related to the effective indices of these modes at different polarization states. In particular, the resonance wavelengths are given as $$\lambda^s = \Lambda_{LPG} \cdot (n_{01}^s - n_{0m}^s),$$

$$\lambda^f = \Lambda_{LPG} \cdot (n_{01}^f - n_{0m}^f)$$

where the superscripts, s and f, indicate the slow and fast polarization states respectively; $n_{01}$ and $n_{0m}$ are the effective indices of the $LP_{01}$ and $LP_{0m}$ modes respectively. Within the current wavelength range of operation (i.e., around 1070 nm), the difference in LPG resonance wavelengths between the two polarization states of $LP_{01}$ and $LP_{08}$ modes in the PM-HOM fiber are related to the birefringence value of these modes and it is given as $$\lambda^s - \lambda^f = \Lambda_{LPG} \cdot ((n_{01}^s - n_{01}^f) - (n_{08}^s - n_{08}^f)) \cong \Lambda_{LPG} \cdot [B_{01} - B_{08}]$$

where $B_{01}$ and $B_{08}$ are the birefringence for the $LP_{01}$ and $LP_{08}$ modes, respectively. FIG. 14 shows an example of the resonance wavelengths between $LP_{01}$ and $LP_{08}$ measured at the fast and slow polarization axes.

Figure 17:
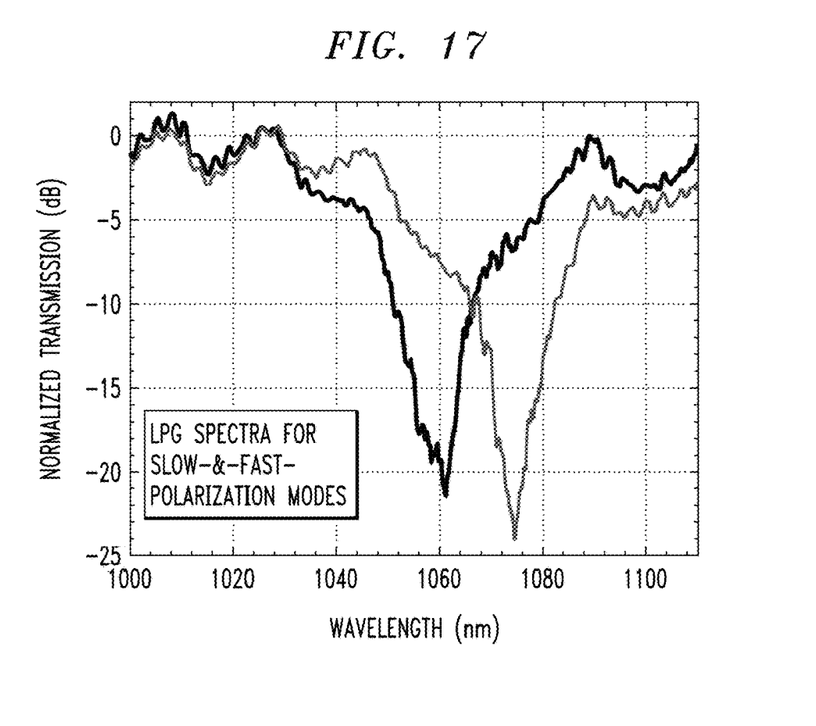
FIG. 17 contains normalized transmission spectra of LPG-inscribed PM-HOM fiber for two different orthogonal polarizations, using a single-mode fiber for in-coupling of light from an optical source into the PM-HOM fiber (the PM-HOM fiber containing an input LPG) and out-coupling of light from the PM-HOM fiber to an optical spectrum analyzer.

This shows that LPGs made in PM-HOM fibers can be used for HOM generation at distinct polarization states. Furthermore, LPGs made in PM-HOM fibers can also be used to perform mode conversion for separate polarization states by choosing the appropriate resonance wavelength, as illustrated in FIG. 17. This wavelength-dependent generation of an HOM with a specific polarization state can be very useful in developing devices, such as single-polarization lasers and low-cost optical sensors. It is to be noted, however, that LPGs made in non-PM fiber provide the same mode conversion resonance wavelength regardless of the polarization states. That is, when the inner core, outer core, and cladding regions in exemplary embodiments of the PM-HOM fiber are properly configured (in terms of their refractive indices and dimensions), mode conversion in such exemplary PM-HOM fibers create excitation of higher-order modes of various polarizations and orientations (including, but not limited to, radially and azimuthally polarized, and hybrid modes).

Summarizing, when configuring a PM-HOM optical fiber in accordance with an exemplary embodiment of the present invention, the separation R1 between inner core 12 and the stress rods 20 is dictated by the maximum allowed value of birefringence B that maintains the integrity of the higher-order $LP_{0m}$ mode-field-distribution (i.e., avoiding mode distortion and mode crossing), thus maintaining a substantially consistent mode-field-area.

Thus, the two parameters D and R1 may be chosen subject to two opposing constraints:

1) The birefringence B is desired to remain above a certain value; and

2) The normalized effective area is desired to be above a certain value which is very close to the unperturbed HOM configuration. That is, it is one goal to minimize any distortion to the mode from a non-uniform stress distribution attributed to the presence of stress rods. Such non-uniformity would distort the mode profile, reducing the $A_{eff}$ value.

Various exemplary embodiments of the present invention comprise silica-based glass, with selected dopants used to control the refractive indicies in the inner core, outer core, and cladding (as well as the trench, when present). The fiber birefringence is induced by dual stress rods located on either side of the fiber core such that their centers (the core and the pair of stress rods) are essentially collinear. The stress rods are formed of a glass having a thermal expansion coefficient significantly different from the material forming the cladding layer, thus inducing the desired stress properties and low refractive index, thus minimizing disturbance on the spatial modes. Exemplary embodiments of the present invention may be embodied within the following dimensional and compositional ranges:

1) overall PM-HOM optical fiber diameter as measured across the cladding layer being in the range of 180 µm to 800 µm;

2) stress rods are formed of a material that exhibits a CTE that is significantly different from that of the glass material of the cladding (e.g., a ΔCTE in the range of about 0.5× $10^{-6}$/K to 7.5×$10^{-6}$/K, when comparing the CTE of the cladding to the CTE of the stress rods);

3) stress rod diameters (D) range from about 50 µm to 150 µm (stress rods may be circular or non-circular);

4) displacement (R1) between the center of the core and a stress rod is the range of about 40 µm to about 200 µm.

These values are exemplary only, and for the purpose of illustrating several different specific embodiments that are considered to fall within the scope of the present invention.

More generally, it is to be noted that these examples and embodiments are merely selected illustrations of the principles of the present invention and do not limit its scope. Additions, omissions, substitutions, and other modifications can be made within a range not departing from the scope of the present invention. Accordingly, the present invention is not limited by the above description and is only limited by the claims appended hereto.

What is claimed is:

1. A polarization-maintaining optical system comprising
an optical signal input configuration for supporting the propagation of an incoming lower-order mode (LOM) multi-wavelength polarization-controlled optical signal;
an input mode converter disposed at an output termination of the optical signal input configuration for converting at least a first wavelength portion of the LOM multi-wavelength optical signal into a selected, higher-order $LP_{nm}$ mode signal; and
a polarization-maintaining higher-order mode (PM-HOM) optical fiber coupled to the input mode converter, the PM-HOM optical fiber supporting the propagation of both the mode-converted first wavelength signal portion propagating at the selected higher-order $LP_{nm}$ mode and a second wavelength portion propagating at a different mode, the PM-HOM optical fiber including
an inner core sized to support propagation of at least the different mode of the second wavelength portion of the multi-wavelength optical signal;
an outer core disposed to surround the inner core, the outer core having a diameter selected to support propagation of the selected, higher-order $LP_{nm}$ mode associated with the first wavelength signal portion of the multi-wavelength optical signal;
a cladding layer disposed to surround the outer core; and
a pair of stress rods disposed substantially within the cladding layer on either side of the outer core and arranged along a common axis, defining a slow polarization axis, the pair of stress rods formed of a material having a coefficient of thermal expansion (CTE) different from the cladding layer CTE, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

2. The polarization-maintaining optical system as defined in claim 1 wherein the second wavelength portion propagates through the inner core of the PM-HOM fiber as a LOM signal.

3. The polarization-maintaining optical system as defined in claim 2 wherein the selected, higher-order $LP_{nm}$ mode for the first wavelength signal portion exhibits a dark spot in a center of its spatial mode pattern and the LOM for the second wavelength signal portion exhibits a bright spot in a center of its spatial mode pattern.

4. The polarization-maintaining optical system as defined in claim 1 wherein the system further comprises
an additional mode converter disposed between the optical signal input configuration and the input mode converter, the additional mode converter configured to convert the second wavelength portion of the LOM multi-wavelength input optical signal into a second higher-order $LP_{nm}$ mode signal, distinct from the first higher-order $LP_{nm}$ mode.

5. A polarization-maintaining optical system for Stimulated Emission Depletion (STED) microscopy comprising
an optical signal input configuration for supporting the propagation of an incoming lower-order mode (LOM) multi-wavelength optical signal, the multi-wavelength optical signal including at least a first wavelength signal portion operating at $\lambda_1$ and associated with an emission band of a material under study and a second wavelength signal portion operating at $\lambda_2$ and associated with an absorption band of the material under study;
an input mode converter disposed at an output termination of the optical signal input configuration for converting the first wavelength signal portion into a selected, higher-order $LP_{nm}$ mode signal exhibiting a dark spot in a center of its mode pattern; and
a polarization-maintaining higher-order mode (PM-HOM) optical fiber coupled to the input mode converter, the PM-HOM optical fiber supporting the propagation of both the mode-converted first wavelength signal portion and the second wavelength signal portion, the PM-HOM optical fiber including
an inner core sized to support propagation of at the second wavelength signal portion as a LOM signal with a bright spot in a center of its mode pattern;
an outer core disposed to surround the inner core, the outer core having a diameter selected to support propagation of the selected, higher-order $LP_{nm}$ mode associated with the first wavelength signal portion;

a cladding layer disposed to surround the outer core; and a pair of stress rods disposed substantially within the cladding layer on either side of the outer core and arranged along a common axis, defining a slow polarization axis, the pair of stress rods formed of a material having a coefficient of thermal expansion (CTE) different from the cladding layer CTE, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

6. A polarization-maintaining optical system comprising an optical signal input configuration for supporting the propagation of an incoming lower-order mode (LOM) optical signal;

an input mode converter disposed at an output termination of the optical signal input configuration for converting a first portion of the LOM optical signal into a selected, higher-order $LP_{nm}$ mode signal, a second, remaining portion of the LOM optical signal distributed among non-selected modes; and a polarization-maintaining higher-order mode (PM-HOM) optical fiber coupled to the input mode converter, the PM-HOM optical fiber supporting the propagation of both the selected higher-order $LP_{nm}$ mode first portion of the optical signal and the remaining second portion distributed among non-selected modes, the PM-HOM optical fiber including an inner core sized to support propagation of at least one of the non-selected modes;

an outer core disposed to surround the inner core, the outer core having a diameter selected to support propagation of the first portion of the optical signal propagating at the selected, higher-order $LP_{nm}$ mode;

a cladding layer disposed to surround the outer core; and a pair of stress rods disposed substantially within the cladding layer on either side of the outer core and arranged along a common axis, defining a slow polarization axis, the pair of stress rods formed of a material having a coefficient of thermal expansion (CTE) different from the cladding layer CTE, where each stress rod exhibits a like diameter D and a like separation R1 between a center of the inner core and an inner edge of a stress rod, the values of D and R1 selected to provide a predetermined stress-induced birefringence for the one or more defined higher-order $LP_{nm}$ modes.

* * * * *